United States Patent [19]

Trageser

[11] Patent Number: 4,772,121
[45] Date of Patent: Sep. 20, 1988

[54] MOVEMENT AND FOCUS CONTROL SYSTEM FOR A HIGH-ENERGY LASER

[75] Inventor: Milton B. Trageser, Winchester, Mass.

[73] Assignee: The Charles Stark Draper Laboratory, Inc., Cambridge, Mass.

[21] Appl. No.: 792,014

[22] Filed: Oct. 28, 1985

[51] Int. Cl.$^4$ .................. G01B 11/26; H01S 3/00
[52] U.S. Cl. .................. 356/152; 356/153; 372/33; 372/34; 372/107; 219/121.74; 219/121.78; 219/121.79; 219/121.81
[58] Field of Search .................. 356/152, 153; 372/33, 372/34, 107; 219/121 LQ, 121 LU, 121 LV, 121 LX

[56] References Cited

U.S. PATENT DOCUMENTS

| | | | |
|---|---|---|---|
| 3,564,452 | 2/1971 | Rempel | 372/107 |
| 3,902,036 | 8/1975 | Zaleckas | 219/121 LX |
| 3,999,858 | 12/1976 | Hernquist et al. | 372/107 |
| 4,146,329 | 3/1979 | King et al. | 356/152 |
| 4,249,140 | 2/1981 | Frieberg | 372/33 |
| 4,530,602 | 7/1985 | Pomphrey | 356/153 |

Primary Examiner—Stephen C. Buczinski
Attorney, Agent, or Firm—Weingarten, Schurgin, Gagnebin & Hayes

[57] ABSTRACT

An alignment laser and cooperative optics are operable to produce sensor images of the cavity mirrors of a high-energy laser system. Means are disclosed responsive to the centroids of the sensor images for providing real-time closed-loop pointing direction control. Means are disclosed responsive to the size of the sensor images for providing real-time closed-loop focus control. A lens system cooperative with the alignment laser and the cavity mirrors is disclosed for establishing and maintaining the alignment laser in a collimated state when illuminating the sensor. In the preferred embodiment, the cavity mirrors are configured as a confocal unstable laser resonator.

12 Claims, 3 Drawing Sheets

MOVEMENT AND FOCUS CONTROL SYSTEM FOR A HIGH-ENERGY LASER

FIELD OF THE INVENTION

This invention is directed to the field of optics, and more particularly, to a novel movement and focus control system for a high-energy laser.

BACKGROUND OF THE INVENTION

High energy laser systems are called upon to provide a high degree of pointing accuracy control of outgoing high-energy laser light. Some typical applications include directed energy weapons, cutting and welding, optical measurements and surveying, and optical communication, among others.

One impediment toward a realization of a requisite pointing direction control in a practicable embodiment is undesired cavity mirror movement such as could be induced by external vibration and thermal gradients. The movement may result either in a tilting of the cavity mirrors or a displacement thereof in directions generally transverse the cavity axis. The movement of the cavity mirrors effectively displaces the optical axis of the laser and in such a way as to introduce an uncertainty in the pointing direction of the outgoing high-energy laser light.

A further impediment to effective control arises from the thermal absorbtion characteristic of the material of the cavity mirrors. The high-energy laser light is partly absorbed as heat by the cavity mirrors. The heat so distorts the figures of the cavity mirrors as to de-focus the outgoing high-energy laser light.

Movement compensation as heretofore contemplated has included various decoupling mounts for resiliently isolating the cavity mirrors from motion-inducing vibrations. The technique is limited in its effectiveness insofar as the degree of decoupling is never complete. It typically presents considerable high-energy laser system interface difficulties, and is wholly ineffective against movement induced by other than vibrational cases.

The heretofore known thermal compensation techniques for high-energy lasers generally have not been entirely satisfactory. Heat transport off the cavity mirrors by means of a suitable heat transfer fluid requires special sub-systems that often are difficult to integrate into the high-energy laser system, and the physics of the heat transfer process inherently limits its utility for some applications. Another technique is to control the degree of mirror figure distortion by keeping the laser power low enough to avoid the deformations; but it is an inapplicable solution where a high power output is either desirable or is required. So-called open loop control represents a further technique to compensate the thermal distortion. A prediction beforehand of the degree of distortion that is expected with time is projected, and the high-energy laser system, in operation, is compensated on this basis. The utility is often limited here, however, by a fundamental inability to accurately predict how the mirrors will actually deform with a sufficient degree of confidence.

SUMMARY OF THE INVENTION

Briefly and in general terms, the present invention makes possible both movement and focus control of a high-energy laser system in real-time in a manner neither requiring special decoupling mounts nor separate heat removing subsystems. The present invention is based in the recognition that movement of the cavity mirrors manifests as a positional variation of an image of the cavity mirrors on a sensor, and is based in the further recognition that thermally-induced cavity mirror figure distortion manifests as a variation of the size of the images from the cavity mirrors on the sensor. The present invention thus in its broad aspect contemplates means for sensing the position of sensor images of the cavity mirrors, further contemplates means responsive to the position of the sensor images representative of the cavity mirrors for providing movement compensation, and further contemplates means responsive to the dimensions of the sensor images of the cavity mirrors for providing focus compensation.

In a presently preferred embodiment, the movement and focus control system for a high-energy laser of the present invention has exemplary utility with a laser cavity having a first concave primary reflector and a spaced apart second convex secondary reflector. Means preferably including an alignment laser and a sensor are disclosed for providing first and second spots respectively representative of the images of the primary reflector and of the secondary reflector on the sensor. Means preferably including two degree of freedom actuators mounted to the cavity reflectors are disclosed responsive to the position of the images of the reflectors on the sensor for moving the reflectors in azimuth and in elevation to provide real-time pointing direction control. Means responsive to the size of the primary and secondary reflector sensor images preferably including one dimensional translation actuators mounted to the primary reflector and/or to the secondary reflector are disclosed for controllably translating one or both of the cavity reflectors to provide real-time focus control. A lens system is disclosed for maintaining the alignment laser light collimated when illuminating the imaging sensor.

BRIEF DESCRIPTION OF THE DRAWINGS

These and other features and advantages of the present invention will become apparent as the invention becomes better understood by referring to the following solely exemplary and non-limiting detailed description of a preferred embodiment thereof, and to the drawings, wherein.

DETAILED DESCRIPTION OF THE PREFERRED EMBODIMENT

Figure 1A:
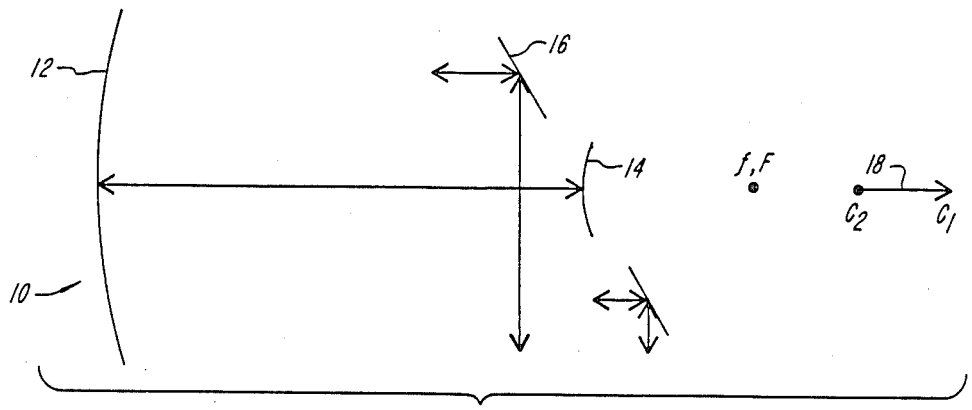
FIG. 1 illustrates in FIGS. 1A through 1C simplified ray diagrams useful in explaining the movement and focus control problems typically encountered during operation of a high-energy laser system.

High energy laser systems such as the confocal unstable laser resonator schematically illustrated in FIG. 1 and generally designated at 10 are called upon to provide outgoing pulses of high-energy laser light toward a targeted object along an optical path. The high-energy laser 10 includes a primary concave reflector 12 and a spaced convex secondary reflector 14 defining in a well-known manner an optically resonant unstable laser cavity therebetween. The primary reflector 12, which is typically a spherical mirror segment, has a focal point designated by a point labelled "F" and a center of curvature designated by a point labelled "$C_1$". The secondary reflector 14 is typically a spherical segment, and has a focal point designated by a point labelled "f" and a center of curvature designated by a point labelled "$C_2$". The reflectors 12, 14 are so spaced that they have a common focus as illustrated by the single point common to the two foci f, F.

Outgoing pulses of laser light are produced by stimulating an active laser medium, not shown, disposed in the cavity of the laser system 10 in the usual manner. The energy is amplified as it oscillates between the cavity mirrors 12, 14, and "walks-out" of the cavity in a well-known manner. A scrapper mirror 16, preferably positioned at a 45° angle to the secondary reflector, may be provided for deviating the energy. The outgoing pulses of high-energy laser light are deviated thereby onto a targeted object, not shown, with a pointing direction determined by a vector 18 joining the centers of curvature of the reflectors, and with a focal condition determined by the foci f, F positions.

The pointing direction of the resonant cavity is determined by the vector 18 joining the centers of curvature of the cavity reflectors. Tilting one or both of the cavity reflectors, and/or movements of one or both of the cavity reflectors transverse the cavity axis, that may be induced, for example, among other things, by external vibration and jitter, then, so displaces the corresponding centers of curvature as to alter the pointing direction of the outgoing pulses of high-energy laser light.

Figure 1B:
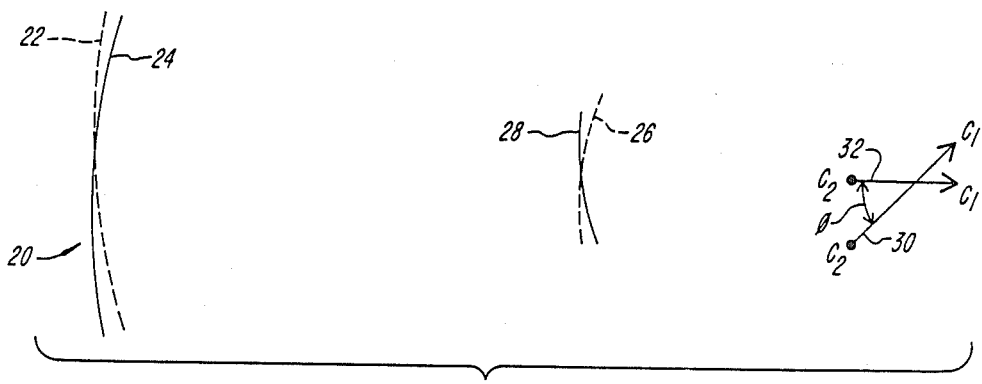

Referring now to FIG. 1B, generally designated at 20 is a pictorial diagram useful in illustrating how reflector tilting induces a pointing direction misalignment effect. A primary reflector illustrated in dashed line 22 having a center of curvature designated by a point labelled "$C'_1$" is illustrated in a tilted position relative to its nominal position illustrated in solid line 24 having a center of curvature designated by a point labelled "$C_1$". A secondary reflector illustrated in dashed line 26 having a center of curvature designated by a point labelled "$C'_2$" is illustrated in a tilted position relative to its nominal position illustrated in solid line 28 having a center of curvature designated by a point labelled "$C_2$". The pointing direction of the tilted mirrors 22, 26 is illustrated by a vector 30, while the nominal pointing direction of the cavity-mirrors 24, 26 is illustrated by a vector 32. An angle designated "$\phi$" defines the resulting mis-alignment in the pointing direction of the laser 20. The movement and focus control system of the present invention is operative to sense reflector motion transverse the axis and/or cavity reflector rotation, and to compensate the spacial orientation of the reflectors in real-time to maintain an intended pointing direction.

Some fraction of the energy generated by the optically resonant cavity is absorbed by the cavity mirrors themselves. In some applications, the energy intensity and reflector absorbtion is sufficiently high to require the use of uncoated, solid metal cavity reflectors. The absorbed energy thermally expands the reflectors and after even a short time period the figure of the reflectors is so distorted thereby as to de-focus the outgoing pulses of laser energy.

Figure 1C:
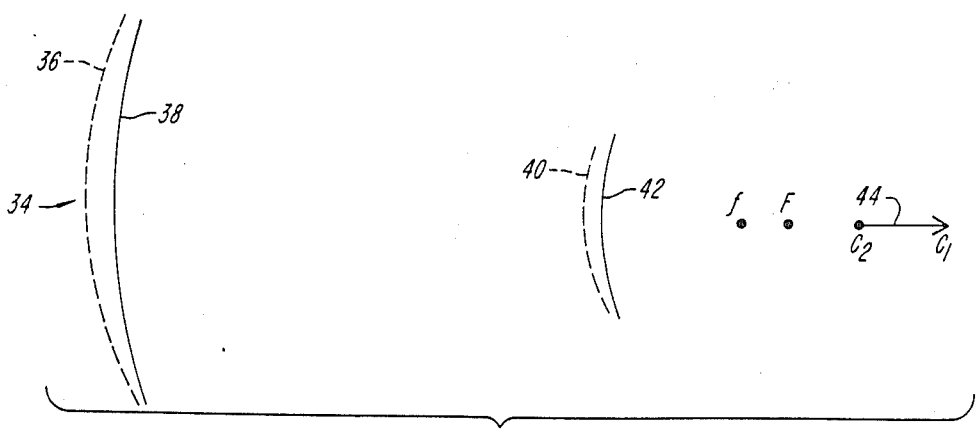

Referring now to FIG. 1C, generally designated at 34 is a pictorial diagram useful in illustrating the thermally-induced mirror figure distortion defocusing effects. A disfigured primary reflector illustrated in dashed line 36 and having a focus designated by a point labelled "F" is shown as symmetrically thermally expanded non-uniformly from its nominal state illustrated in solid outline 38. A disfigured secondary reflector illustrated in dashed line 40 and having a focus designated by a point labelled "f" is shown as symmetrically non-uniformly thermally expanded from its nominal state illustrated in solid outline 42. The illustrated symmetrical but non-uniform distortion 36, 40 of the primary and secondary reflectors does not alter the pointing direction of the cavity as determined by a vector 44 joining the centers of curvature of the reflectors as designated by points labelled $C_1$, $C_2$. In practice, however, and as will be appreciated by those skilled in the art, the thermal distortion of the figure of the reflectors is not symmetrical, so that the pointing direction of the cavity is also adversely affected by the thermal loading.

The focus of the outgoing high-energy laser light pulses is determined by the focal condition of the cavity. Thermal reflector loading spacially displaces the respective foci "f, F" of the reflectors 38, 42 as is illustrated by separate points, so that the outgoing high-energy laser light pulses are thereby de-focused by the thermal figure distortions. The movement and focus control system for a high-energy laser of the present invention is responsive to the disfigurement of the primary and secondary reflectors and operative to establish and maintain a cavity confocal condition in real-time.

Figure 2:
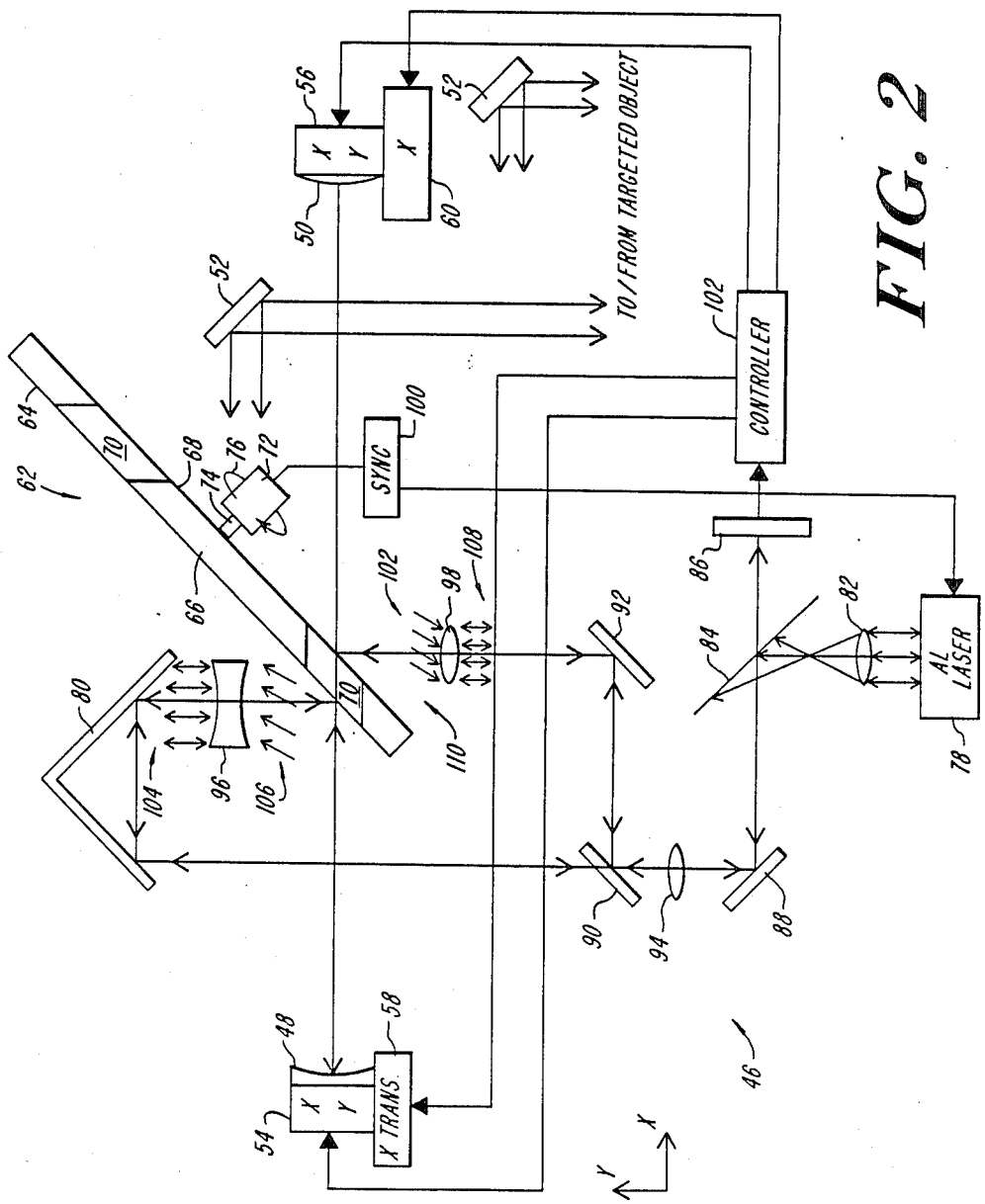
FIG. 2 is a schematic diagram illustrating a presently preferred embodiment of the movement and focus control system for a high-energy laser according to the present invention.

Referring now to FIG. 2, generally designated at 46 is a schematic diagram illustrating the novel movement and focus control system for a high-energy laser according to the present invention. The system 46 includes a concave primary reflector 48 and a spaced-apart convex secondary reflector 50 defining therebetween an optically resonant unstable laser cavity. The reflectors 48, 50 each have a focus, and are so spaced that their foci are located at a common focal point. A 45° scrapper mirror 52 preferably is provided adjacent the convex secondary reflector 50 in well-known position. An x,y actuator 54 is mounted to the back of the concave primary reflector 48, and an x,y actuator 56 is mounted to the back of the concave secondary reflector 50. The actuators 54, 56 are operative to controllably tilt the cavity reflectors 48, 50 in azimuth and in elevation to preserve an intended pointing direction. An X transducer 58 is mounted to the primary reflector 48/actuator assembly 54, and an X transducer 60 is mounted to the convex secondary reflector 50/actuator 56 assembly. The X transducers 58, 60 are operative to axially move one or both of the reflectors 48, 50 to provide realtime focus control.

A laser separator generally designated 62 having a common optical aperture is provided intermediate the primary reflector 48 and the secondary reflector 50. The laser separator 62 preferably includes a rotating metallic disc 64 having a highly polished surface 66 confronting the primary reflector 48 and a highly polished reflecting surface 68 confronting the secondary reflector 50. The disk 64 includes two diametrically opposed bores 70 therethrough, and is mounted to a motor 72 on a shaft 74 for rotation in an angular direction illustrated by an arrow 76. The separator 62 is the subject of co-pending utility patent application Ser. No. 512,153, entitled COMMON OPTICAL APERTURE LASER SEPARATOR FOR RECIPROCAL PATH OPTICAL SYSTEMS, invented by William M. Johnson and assigned to the same assignee as the instant invention, incorporated herein by reference, and reference may be made thereto for a further description of the laser separator. The separator 62 allows the generation of pulses of outgoing high-energy laser light repetitively, and in such a way that during the interpulse intervals of successive outgoing pulses movement and/or focus mis-alignments can be determined and compensated relative to the common optical aperture. It should be noted that other laser separators other than the separator 62 operative to separate laser light along a common optical aperture either in frequency or in space can be employed as well without departing from the inventive concept.

An alignment laser 78, typically of a low-power, is provided to one side of the laser separator 62, and a corner cube reflector 80 is provided to the other side of the laser separator 62. A lens 82 having a focal point is provided adjacent the output and along the optical path of the alignment laser 78, and a beam splitter 84 is provided along the optical path of the alignment laser 78. A sensor 86 is provided confronting the beam splitter 84. The elements 82, 84, 86 are so placed as to provide outgoing alignment laser light as if from a point source. A mirror 88, a beam splitter 90, and a mirror 92 are provided along the optical path of the alignment laser 78. A lens 94 is provided along the optical path of the alignment laser 78 and intermediate the members 88, 90 for focusing light present along the optical path onto the sensor 86 and for collimating the outgoing alignment laser light. A diverging lens 96 to be described is provided along the optical path of the alignment laser for collimating alignment laser light reflected off of the convex reflector 48, and a converging lens 98 to be described is provided along the optical path of the alignment laser for collimating alignment laser light reflected off the convex reflector 50 to be described.

At times synchronous with the alignment of individual ones of the bores 70 of the spinning disk 62 with the optical axis defined between the reflectors 48, 50, the laser light generated by any suitable means in the cavity oscillates between the cavity mirrors 48, 50, walks-off the convex reflector onto the 45° scrapper mirror 52 in well-known manner, and is deviated therfrom onto a targeted object. At times synchronous with the interpulse intervals defined between successive outgoing pulses of laser light, corresponding reflective surfaces 66, 68 of the spinning disk 62 are oriented along the cavity optical axis defined between the reflectors 48, 50. Reference may be had to co-pending U.S. utility patent application Ser. No. 516,468 entitled COMMON OPTICAL APERTURE LASER BORESIGHTER FOR A RECIPROCAL PATH OPTICAL SYSTEM, invented by William M. Johnson et al and assigned to the same assignee as the instant invention, incorporated herein by reference, for its disclosure of a similar confocal cavity spinning disk and an alignment laser operable to provide boresight alignment of the outgoing pulses of high-energy laser light produced thereby.

A synchronizer 100 coupled to the motor 72 is responsive to the angular position of the spinning disk 62 to pulse the alignment laser 78 at the times when the reflecting surfaces 66, 68 of the disk 64 are aligned with the cavity axis corresponding to the interpulse intervals of successive outgoing pulses of high-energy laser light.

During the interpulse intervals, the alignment laser beam traverses the lens 82 and is deviated off the elements 84, 88 through the lens 94 onto the beam splitter 90. A part of the alignment laser beam passes through the beam splitter 90 onto the corner reflector 80. The reflector 80 deviates it via the diverging lens 96 onto the reflecting surface 66 of the spinning disk 64, and this beam is in turn diverted thereoff onto the primary reflector 48. The alignment laser beam is reflected back thereoff and onto the reflecting surface 66 of the spinning disk 64, which deviates it back again through the lens 96, the corner reflector 80, and the elements 90, 94, 88, and 84 onto the surface of the sensor 86.

The remaining portion of the alignment laser beam during the interpulse intervals is deviated off the beam splitter 90 onto the mirror 92, which in turn deviates it through the converging lens 98 onto the reflecting surface 68 of the spinning mirror 64. The surface 68 deviates the alignment laser beam onto the surface of the convex reflector 50, which reflects it back off the mirrored surface 68 of the spinning disk 64 back through the lens 98 and the elements 92, 90, 94, 88 and 84 onto the sensor 86.

The alignment beam images of the convex and concave reflectors on the sensor 86, in terms of their position and their spot size, make possible as appears below both movement and focus control of the system 46 in accordance with the present invention.

A controller 102 is connected to the x,y tilt actuators 54, 56 of the reflectors 48, 50 respectively, and is connected to the X transducers 58, 60 of the reflectors 48, 50 respectively. As described more fully hereinbelow, the controller 102 is responsive to the spot size of the alignment beam images of the reflectors 48, 50 on the sensor to so axially move one or both of the mirrors 48, 50 as to preserve the confocal condition of the resonator to compensate for thermally-induced mirror disfiguration, and is responsive to both the spot size and to the position of the centroids of the images of the reflectors 48, 50 to so tilt one or both of the reflectors 48, 50 to preserve an intended cavity pointing direction as to compensate reflector translation and/or rotation induced mis-alignments.

The diverging lens 96 is positioned along the optical path of the alignment laser such that its focal point is coincident with the center of curvature of the concave mirror 48, and the converging lens 98 is positioned along the optical path of the alignment laser with its focal point coincident with the center of curvature of the convex secondary reflector 56.

The portion of the collimated alignment laser beam that passes through the lens 96 diverges as if from the center of curvature of the concave primary reflector 48, and is reflected back thereoff as a convergent bundle toward that center of curvature. The reflected light converges the same amount as the divergence imparted by the lens 96 such that the light from the concave reflector 48 on the way back to the sensor 86 remains collimated as schematically illustrated by parallel rays generally designated 104. Since the lens 96 maintains the collimation of the alignment beam image of the reflector 48, any movement of the primary reflector 48, such as would arise from vibration, manifests as parallel rays generally designated 106 that are inclined at that angle to the rays 104 that corresponds to the movement of the reflector 98. The degree of motion of the primary reflector 48 therewith manifests as a positional change of the centroids of the concave reflector image relative to optical null on the alignment sensor 86.

In a similar manner, the portion of the collimated alignment laser beam that passes through the lens 98 converges to the center of curvature of the convex reflector 50, and is reflected back thereoff as a divergent bundle and back through the converging lens 98. The divergence of the bundle backoff the convex reflector 50 diverges the same amount as the convergence of the lens 98, which thereby maintains the collimated characteristic of the reflected light as schematically illustrated by collimated rays generally designated 108. Any movement of the convex reflector 50 thus manifests as a different direction of the pointing direction of the the collimated alignment laser beam reflected off of the convex reflector 50, as is schematically illustrated by angled collimated rays generally designated 110. Any tilting of the convex reflector 50 therewith manifests as a corresponding positional variation of the centroid of the image of the convex reflector relative to optical null on the alignment sensor 86. The lens 94 focuses the collimated alignment beam images of the reflectors 48, 50 onto the focal plane of the alignment sensor 86.

Figure 3B:
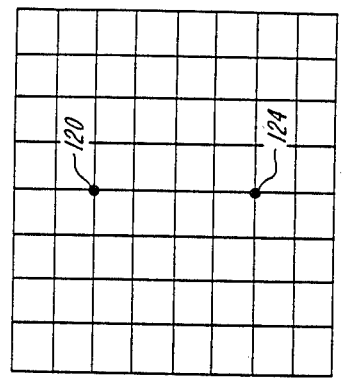
FIG. 3 illustrates in FIG. 3A a pictorial diagram and in FIG. 3B a sensor plan diagram useful in explaining the principle of the movement and focus control system for a high-energy laser according to the present invention.
Figure 3A:
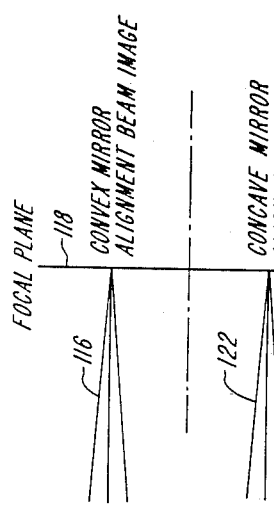

FIGS. 3 and 4 are useful in illustrating the principle of the present invention that makes possible closed-loop high-energy laser focus control by determining the spot size of the alignment beam images of the concave and convex cavity reflectors on the sensor 86 in real-time. Referring now to FIG. 3, generally designated at 112 in FIG. 3A is a schematic diagram and generally designated at 114 in FIG. 3B is a sensor plan diagram illustrating the state of the system where there is no thermal distortion of the figure of the primary reflector 48 and of the figure of the secondary reflector 50. The return collimated alignment laser beam reflected off of the convex secondary reflector 50 (FIG. 2) is focused by the lens 94 (FIG. 2) as a converging bundle 116 onto the focal plane 118 of the sensor 84 (FIG. 2) producing a spot designated by a point labelled 120 on the sensor as can be seen in FIG. 3B. The collimated alignment beam reflected off of the primary reflector 48 (FIG. 2) is deviated off of the corner reflector 80 and is focused by the lens 94 (FIG. 2) as a converging bundle 122 onto the focal plane 118 of the sensor 86 (FIG. 2) producing a spot designated by a point labelled 124 representative thereof on the alignment sensor. When the high-energy laser is in-focus, the collimated alignment laser images of the cavity reflectors on the sensor have a predetermined spot-like size.

Figure 4B:
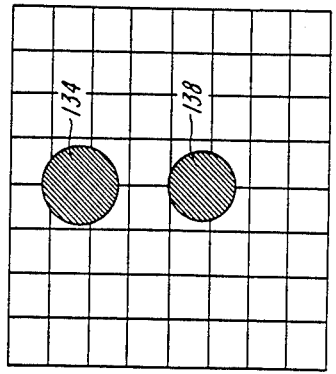
FIG. 4 illustrates in FIG. 4A a pictorial diagram and in FIG. 4B a sensor plan diagram useful in further explaining the principle of the movement and focus control system for a high-energy laser according to the present invention.
Figure 4A:
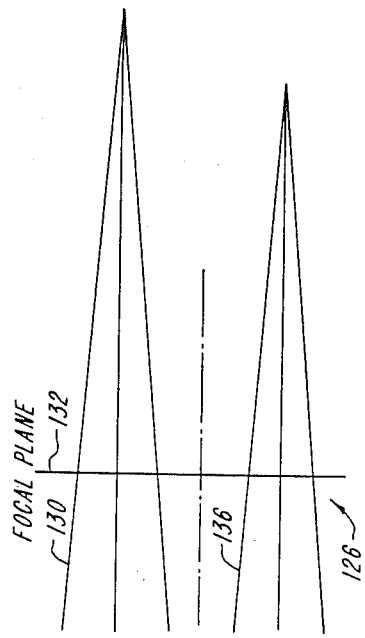

Referring now to FIG. 4, generally designated at 126 in FIG. 4A is a schematic diagram and generally designated at 128 in FIG. 4B is a sensor plan diagram illustrating the state of the system where there is thermally-induced different figure distortion of the primary and of the secondary cavity reflectors. The thermal loading of the cavity reflectors distorts the figures in such a way that the cavity is no longer in a confocal condition. The focal lengths of the lens 96, 98 (FIG. 2) then are no longer coincident to the respective centers of curvature of the associated cavity reflectors. Since the collimated alignment beam reflected by the convex reflector 50 (FIG. 2) as schematically illustrated as a converging bundle 130 in FIG. 4A is not then focused by the lens 94 (FIG. 2) on the focal plane 132 of the sensor 86, it produces a comparatively much larger image thereof as designated by a spot 134 (FIG. 4B) on the alignment sensor. In a similar manner, the collimated alignment beam reflected off of the convex primary reflector 48 (FIG. 2) as schematically illustrated by a converging bundle 136 (FIG. 4A) is not focused on the focal plane 132 and likewise produces a comparatively much larger image representative thereof as designated by a spot 138 (FIG. 4B) on the alignment sensor.

Figure 5:
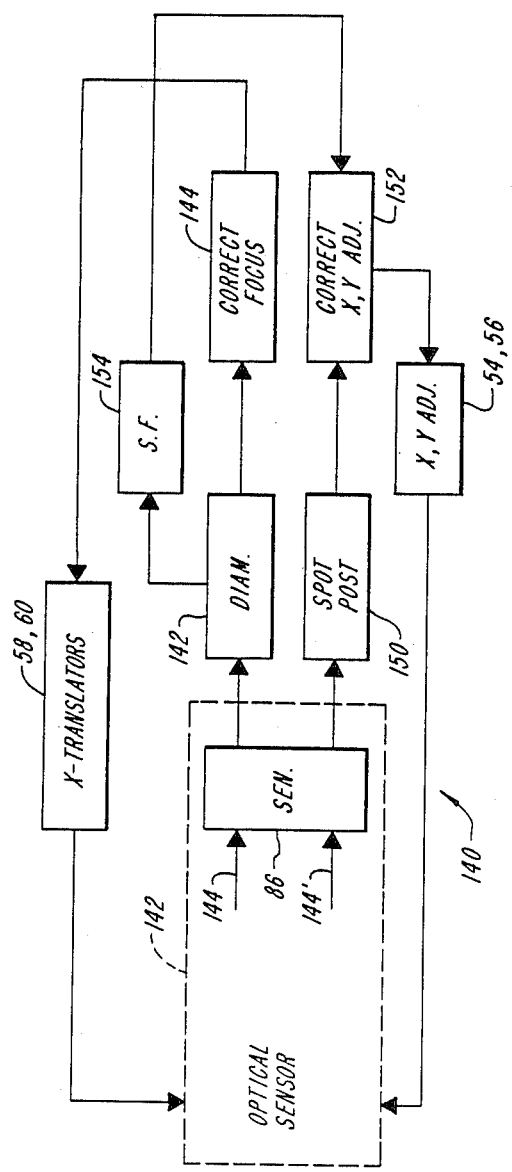
FIG. 5 is a block diagram illustrating a controller of the movement and focus control system for a high-energy laser according to the present invention.

The different sizes of the spots 134, 138 are proportional to the degree by which the cavity is out of its intended confocal condition. Referring now to FIG. 5, generally designated at 140 is a block diagram of a presently preferred embodiment of the controller 102 of FIG. 2. The optical system described above in connection with the description of FIG. 2 is schematically illustrated by a dashed box 142, in which the collimated alignment beams respectively reflected off of the primary and secondary reflectors are designated schematically by two arrows 144, 144' shown incident on the alignment sensor 86. The alignment sensor preferably is a mosaic array sensor having a N×N photo-responsive pixel array. Other suitable sensors including optical choopers, annular diaphragms, and conical scan sensors can also be employed without departing from the inventive concept.

As illustrated by a circuit block 142 designated "DIAM", the number of pixels illuminated by the sensor images of the collimated alignment beams 144, 144' are determined, and an electrical signal representative of the diameters of the alignment beam images is produced. The electrical signal is applied to a circuit block 144 designated "CORRECT FOCUS", which is responsive to the diameter signals to provide X transducer control signals having a value proportional to the size of the spots. The X transducer control signals are applied to the actuators 58, 60 to so move the reflectors 148, 150 as to preserve the confocal condition of the cavity. Subsequent outgoing pulses of high-energy laser light thus are in-focus, and the above-described process is repeated in real-time to provide closed-loop focus control compensation.

As illustrated by a circuit block 150 designated "SPOT POST", the centroids of the primary and secondary reflector sensor images of the alignment laser beams 144, 144' are determined, and an electrical signal representative of the position of the spots relative to sensor optical null is provided. A circuit block 152 designated "S.F." is responsive to an output of the block 142 to provide a signal representative of the distance between the centers of curvature of the reflectors. A circuit block 154 designated "CORRECT x,y ADJ" is responsive to the signal representative of the position of the centroids of the images and to the scale factor compensation signal provided by the circuit 152 to provide closed-loop x,y actuator control signals representative of cavity reflector movement. The x,y actuator control signals are applied to the x,y tilt actuators 54, 56 (FIG. 2) to maintain an intended pointing direction of the subsequent outgoing high-energy laser light in real-time.

It will be appreciated that many modifications of the presently disclosed invention will be apparent to those skilled in the art without departing from the scope of the appended claims.

What is claimed is:

1. A movement and focus control system for a high-energy laser having spaced cavity mirrors defining an intended pointing direction and an intended focal condition, said laser being subject to tilting and translation movement of its cavity mirrors resulting in an undesirable deviation in the intended pointing direction of the laser, said laser being further subject to thermal loading of its cavity mirrors resulting in an undesirable deviation in the intended focal condition of the laser, comprising;
   means for providing sensor images of the cavity mirrors;
   means for sensing position and size of the sensor images of the cavity mirrors;
   means responsive at least to the sensed positions of the sensor images for providing compensation of the deviation in the intended pointing direction of the laser; and
   means responsive to the sensed size of the sensor images for providing compensation of the deviation in the intended focal condition of the laser.

2. A movement and focus control system for a high-energy laser having an optical cavity constituted by first and second spaced reflectors that are subject to undesirable movement and to thermal loading-induced defocusing, comprising:
   a sensor;
   means for providing a first optical image of said first cavity mirror on said sensor;
   means for providing a second optical image of said second cavity mirror on said sensor;
   means responsive at least to the centroids of said first and of said second optical images on said sensor for providing a tilt control signal;
   means coupled to said first cavity mirror for selectively tilting said first cavity mirror in azimuth and in elevation in response to said tilt control signal;
   means responsive to the size of the first and of the second images on the sensor for providing a translation control signal; and
   means coupled to said first cavity mirror for selectively translating said first cavity mirror in response to said translation control signal.

3. The movement and focus control system of claim 2, wherein said first optical image providing means includes an alignment laser for providing an alignment laser beam, and means for deviating said alignment laser beam along a first optical path defined between said first mirror and said sensor.

4. The movement and focus control system of claim 2, wherein said second optical image providing means includes an alignment laser for providing an alignment laser beam, and means for deviating said alignment laser beam along a second optical path defined between said second mirror and said sensor.

5. The movement and focus control system of claim 4, wherein said first and said second cavity reflectors consist of a concave reflector and a convex reflector; and further including means positioned along said first and said second optical paths for collimating said alignment laser beam when illuminating said sensor.

6. The movement and focus control system of claim 2, further including means coupled to said second cavity mirror for selectively tilting said second cavity mirror in azimuth and elevation.

7. The movement and focus control system of claim 6, wherein said each of said cavity mirror tilt means include an x, y actuator fastened to the backs of respective ones of said cavity mirrors.

8. The movement and focus control system of claim 2, further including means coupled to said second cavity mirror for selectively translating it.

9. The movement and focus control system of claim 8, wherein said translation control means includes an X transducer mounted to respective ones of said first and second cavity mirrors.

10. In a high-energy laser having an unstable confocal laser cavity constituted by selectively spaced concave and convex reflectors, apparatus comprising:
    a sensor;
    an alignment laser for providing a collimated laser beam;
    means for directing said alignment laser beam along a first optical path defined between said concave reflector and said sensor;
    means disposed along said first optical path for converting said collimated alignment laser beam into a divergent bundle when illuminating said concave reflector;
    means for directing said alignment laser beam along a second optical path defined between said convex reflector and said sensor; and
    means disposed along said second optical path for converting said collimated alignment laser beam into a convergent bundle when illuminating said convex reflector.

11. The movement and focus control system of claim 10, wherein said concave reflector has a center of curvature, wherein said convex reflector has a center of curvature, and wherein said means disposed along said first optical path includes a divergent lens having a focal point positioned along the first optical path such that its focal point is coincident with the center of curvature of the concave reflector.

12. The movement and focus control system of claim 10, wherein said concave and said convex reflectors each have a center of curvature, and wherein said means disposed along said second optical path include a convergent lens having a focal length and so positioned along the second optical path that the focal length is coincident with the center of curvature of the convex reflector.

* * * * *